US009694665B2

(12) United States Patent
Matsuda

(10) Patent No.: US 9,694,665 B2
(45) Date of Patent: Jul. 4, 2017

(54) ELECTRIC VEHICLE

(71) Applicant: Kawasaki Jukogyo Kabushiki Kaisha, Kobe-shi, Hyogo (JP)

(72) Inventor: Yoshimoto Matsuda, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 131 days.

(21) Appl. No.: 14/429,756

(22) PCT Filed: Sep. 26, 2012

(86) PCT No.: PCT/JP2012/006119
§ 371 (c)(1),
(2) Date: Mar. 19, 2015

(87) PCT Pub. No.: WO2014/049640
PCT Pub. Date: Apr. 3, 2014

(65) Prior Publication Data
US 2015/0246607 A1 Sep. 3, 2015

(51) Int. Cl.
*B60K 11/04* (2006.01)
*B60L 11/18* (2006.01)
(Continued)

(52) U.S. Cl.
CPC ............. *B60K 11/04* (2013.01); *B60K 1/00* (2013.01); *B60K 17/356* (2013.01);
(Continued)

(58) Field of Classification Search
CPC ............. B60K 11/04; B60K 2001/003; B60Y 2200/20; B60L 2200/36; B60G 2300/07
See application file for complete search history.

(56) References Cited

U.S. PATENT DOCUMENTS 4,267,895 A * 5/1981 Eggert, Jr. ............... B60K 1/04
180/291
4,854,278 A * 8/1989 Honecker ............. B60K 11/02
123/198 E
(Continued)

FOREIGN PATENT DOCUMENTS

JP 524572 Y2 6/1993
JP 2001105893 A 4/2001
(Continued)

OTHER PUBLICATIONS

ISA Japanese Patent Office, International Search Report of PCT/JP2012/006119, Nov. 27, 2012, WIPO, 3 pages.

*Primary Examiner* — Brian Swenson
(74) *Attorney, Agent, or Firm* — Alleman Hall Creasman & Tuttle LLP

(57) ABSTRACT

A liquid leakage countermeasure of a cooling medium channel is facilitated, and a need of high power of a pump for circulating a cooling medium is relaxed. An electric vehicle includes: a vehicle body including a dashboard which separates a front space covered with a hood and a boarding space provided with a seat on which a driver is seated; an electric component which is provided behind the dashboard and generates heat by electric energy for generating rotational power for vehicle traveling; and a heat exchanger provided behind the dashboard and configured to cool down a cooling medium circulating between the heat exchanger and the electric component.

16 Claims, 5 Drawing Sheets

(51) Int. Cl.
*B60K 1/00* (2006.01)
*B60K 17/356* (2006.01)
*B60K 1/02* (2006.01)
*B60K 11/02* (2006.01)

(52) U.S. Cl.
CPC ............ *B60L 11/1877* (2013.01); *B60K 1/02* (2013.01); *B60K 11/02* (2013.01); *B60K 2001/001* (2013.01); *B60K 2001/003* (2013.01); *B60K 2001/006* (2013.01); *B60L 2200/36* (2013.01); *B60L 2240/34* (2013.01); *B60Y 2200/20* (2013.01); *Y02T 10/705* (2013.01); *Y02T 10/7005* (2013.01)

(56) References Cited

U.S. PATENT DOCUMENTS

| | | | | |
|---|---|---|---|---|
| 6,568,494 | B2 * | 5/2003 | Takahashi | B60K 6/22 165/41 |
| 7,896,421 | B2 * | 3/2011 | Kosuge | B62D 25/20 296/193.07 |
| 2008/0060589 | A1 * | 3/2008 | Carney | B60K 11/02 123/41.31 |
| 2011/0284298 | A1 * | 11/2011 | Ajisaka | B60H 1/00535 180/65.21 |
| 2012/0292121 | A1 * | 11/2012 | Murray | B60K 11/08 180/68.1 |

FOREIGN PATENT DOCUMENTS

| | | |
|---|---|---|
| JP | 2002067705 A | 3/2002 |
| JP | 2004140881 A | 5/2004 |
| JP | 2005096706 A | 4/2005 |
| JP | 2009023557 A | 2/2009 |
| JP | 2009126256 A | 6/2009 |
| JP | 2010095108 A | 4/2010 |

* cited by examiner

ELECTRIC VEHICLE

TECHNICAL FIELD

The present invention relates to an electric vehicle configured to use electric energy to generate rotational power for vehicle traveling.

BACKGROUND ART

According to a conventional internal combustion engine type four-wheeled vehicle, an internal combustion engine is mounted in a vehicle body, and a radiator for cooling down a cooling medium which takes heat from the internal combustion engine is arranged in a front space located under a hood (PTL 1). This is because since the internal combustion engine is considerably high in temperature during traveling, and the radiator is required to have a high heat exchange performance, ram air from the front strongly blows against the radiator.

In recent years, an electric vehicle including an electric motor as a driving source instead of the internal combustion engine has been developed. Even in a case where the internal combustion engine is replaced with the electric motor, an inverter which controls the electric motor and the like generate heat, so that a cooling system may be mounted. In a case where a liquid-cooled system is adopted as the cooling system, the radiator is normally arranged in the front space located under the hood as with conventional cases.

CITATION LIST

Patent Literature

PTL 1: U.S. Pat. No. 7,896,421

SUMMARY OF INVENTION

Technical Problems

However, in a case where electric components, such as the inverter, which generate heat, are mounted behind the front space, cooling medium pipes connecting the electric components and the radiator need to be arranged so as to extend through a dashboard in a forward and rearward direction. Therefore, the pipes become long. In this case, a liquid leakage countermeasure of the cooling medium pipes is required, and a pump for circulating the cooling medium is required to have high power.

An object of the present invention is to facilitate the liquid leakage countermeasure of the cooling medium channel and relax the need of the high power of the pump for circulating the cooling medium.

Solution to Problem

An electric vehicle according to the present invention includes: a vehicle body including a dashboard which separates a front space covered with a hood and a boarding space provided with a seat on which a driver is seated; an electric component which is provided behind the dashboard and generates heat by electric energy for generating rotational power for vehicle traveling; and a heat exchanger provided behind the dashboard and configured to cool down a cooling medium circulating between the heat exchanger and the electric component.

According to the above configuration, in a case where the electric component which generates heat is arranged behind the dashboard in the electric vehicle, the heat exchanger through which the cooling medium for cooling down the electric component flows is also arranged behind the dashboard. Therefore, a cooling medium channel between the heat exchanger and the electric component can be made short. To be specific, the present inventors have focused on the fact that the amount of heat generated by the electric component of the electric vehicle is smaller than the amount of heat generated by the internal combustion engine. According to common knowledge, the heat exchanger is arranged at a front space located under a hood. However, the present inventors have achieved arranging the heat exchanger and the electric component close to each other in a liquid cooling system. Therefore, the liquid leakage countermeasure of the cooling medium channel can be facilitated, and the need of increasing the performance of the pump for circulating the cooling medium can be eliminated.

The electric vehicle according to claim 1 may be configured such that: the vehicle body includes a vehicle body exposed surface facing an outer space; the heat exchanger radiates the heat of the cooling medium to outside air which contacts and flows through the heat exchanger; and the heat exchanger is arranged outside the vehicle body exposed surface so as to extend in a direction along the vehicle body exposed surface or a direction intersecting with the vehicle body exposed surface.

According to the above configuration, even in a case where a driving speed is low, ram air flowing rearward through the vehicle body along a virtual line extending along the vehicle body exposed surface suitably takes heat from the heat exchanger. Thus, an adequate cooling performance for cooling down heat generating parts can be obtained.

The electric vehicle may be configured such that: the heat exchanger radiates the heat of the cooling medium to outside air which contacts and flows through the heat exchanger; the heat exchanger is arranged so as to intersect with a forward and rearward direction of the electric vehicle; and the heat exchanger is provided at such a position that at least a part thereof is visible when viewed from a vehicle rear side.

According to the above configuration, at least a part of the heat exchanger is visible when viewed from the vehicle rear side. Therefore, outside air more easily contacts and flows through the heat exchanger than in a case where the rear side of the heat exchanger is covered with other parts, so that ventilation resistance becomes low. On this account, even in a case where the heat exchanger is not provided in front of the dashboard, the heat exchange between the outside air and the cooling medium can be performed smoothly.

The electric vehicle may be configured such that the heat exchanger is arranged behind axles of rear wheels and under and in front of a rear end of the vehicle body.

According to the above configuration, since the heat exchanger is arranged behind the axles of the rear wheels, the number of other parts arranged behind the heat exchanger is small. Thus, the ventilation resistance when the outside air contacts and flows through the heat exchanger can be made adequately low. In addition, the heat exchanger is arranged in front of the rear end of the vehicle body. Therefore, even in a case where an obstacle or the like gets close to the vehicle from behind, it will contact the vehicle body before contacting the heat exchanger. On this account, the heat exchanger can be easily protected.

The electric vehicle may further include a cargo bed provided at the vehicle body so as to be arranged behind the boarding space, wherein the heat exchanger and the electric component are arranged under the cargo bed.

According to the above configuration, since both the electric component and the heat exchanger are arranged at a space located under the cargo bed, the cooling liquid channel between the heat exchanger and the electric component can be arranged in the same space. Thus, the layout of the cooling system of the electric component can be simplified and made compact.

The electric vehicle may be configured such that the electric component includes at least an inverter.

According to the above configuration, the inverter which becomes high in temperature can be effectively cooled down.

Advantageous Effects of Invention

As is clear from the above explanation, according to the present invention, the liquid leakage countermeasure of the cooling medium channel can be facilitated, and the need to increase the performance of the pump for circulating the cooling medium can be eliminated.

DESCRIPTION OF EMBODIMENTS

Hereinafter, embodiments according to the present invention will be explained in reference to the drawings. The stated directions are from the perspective of a driver in an electric utility vehicle 1.

Embodiment 1

Figure 1:
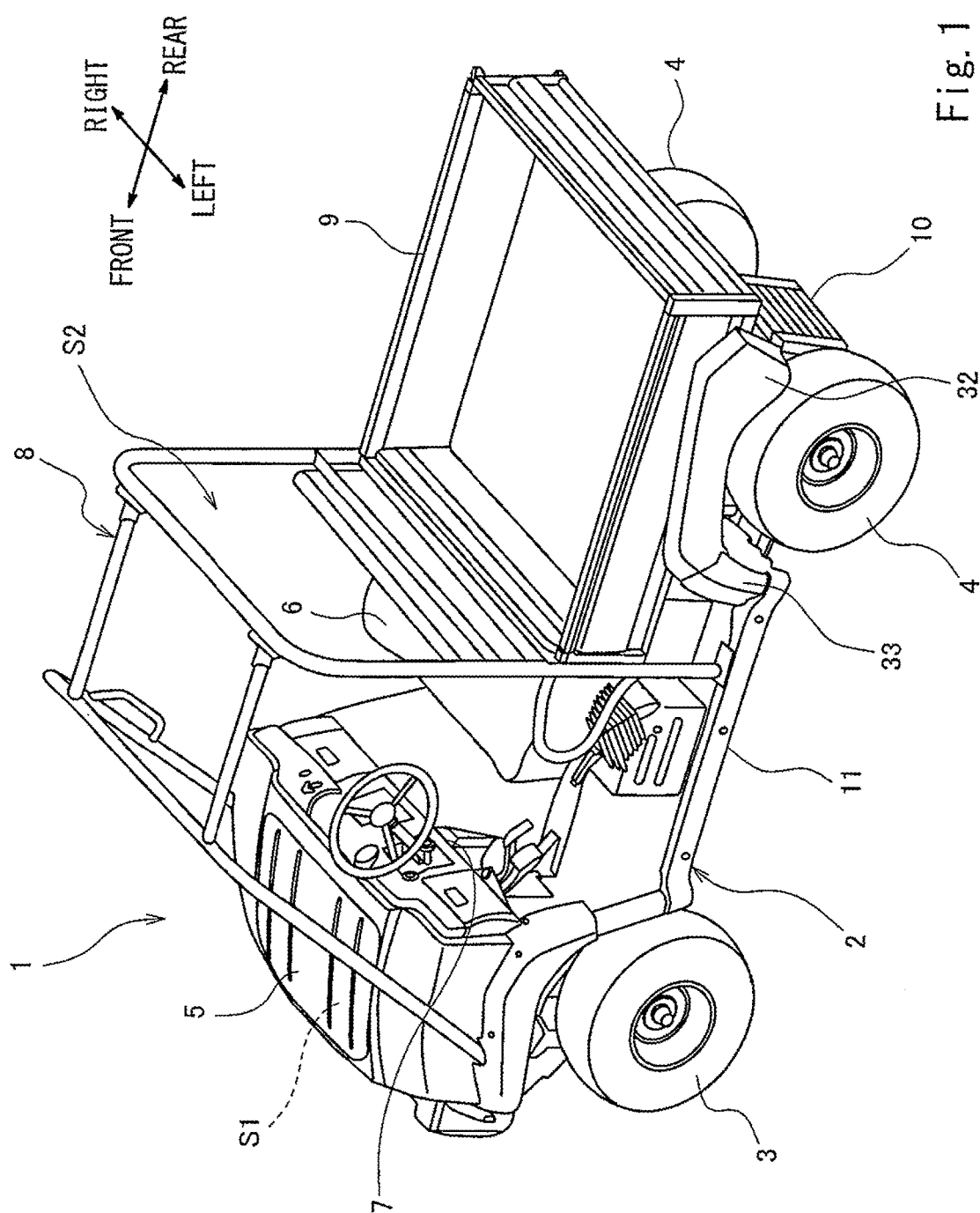
FIG. 1 is a perspective view showing an electric utility vehicle according to Embodiment 1 of the present invention.

FIG. 1 is a perspective view showing the electric utility vehicle 1 according to Embodiment 1 of the present invention. As shown in FIG. 1, the electric utility vehicle 1 is an electric vehicle which does not include an internal combustion engine and generates rotational power by electric power, supplied from a power supply, to drive wheels. The electric utility vehicle 1 is a low-speed traveling vehicle whose maximum speed is not higher than 25 miles per hour (about 40 km/h). The electric utility vehicle 1 includes: a pair of left and right front wheels 3 provided at a front portion of a vehicle body 2; and a pair of left and right rear wheels 4 provided at a rear portion of the vehicle body 2. The front wheels 3 and the rear wheels 4 respectively include so-called balloon tires that are low pressure tires. The front wheels 3 and the rear wheels 4 can travel on off-road surfaces. A front space S1 between the left and right front wheels 3 is covered with a hood 5 from above. A laterally long seat 6 on which a driver and a passenger are seated is provided in the vicinity of a vehicle body forward and rearward direction center portion located behind the hood 5. The vehicle body 2 is provided with a dashboard 7 which separates the front space Si and a boarding space S2 at which the seat 6 is arranged. The vehicle body 2 is provided with a cabin frame 8 which extends from left and right sides of the hood 5 to a floor frame 11 located at an obliquely rear lower side of the seat 6 and surrounds the boarding space S2 at which the seat 6 is arranged.

The cabin frame 8 is a metal cylindrical pipe and is formed to leave open front, rear, left, right, and upper portions of the boarding space S2. To be specific, the vehicle body 2 does not include a door for entering into and getting out from the boarding space S2. The vehicle body 2 is provided with a cargo bed 9 located behind the boarding space S2. The cargo bed 9 includes: a bottom wall which is square in plan view; and side walls projecting upward from four sides of the bottom wall. The cargo bed 9 is open upward. First fenders 32 respectively covering the rear wheels 4 from above are attached to the cargo bed 9, and second fenders 33 which are respectively, continuously provided at front sides of the first fenders 32 are attached to a floor frame 11. The cargo bed 9 can bank manually or automatically so as to incline rearward. A radiator 10 (heat exchanger) arranged under the cargo bed 9 and between the left and right rear wheels 4 is attached to the vehicle body 2. To be specific, the radiator 10 is arranged behind the dashboard 7. The radiator 10 is a heat exchanger configured to radiate heat of a cooling medium (oil, for example) to ram air which contacts and flows through the radiator 10.

Figure 2:
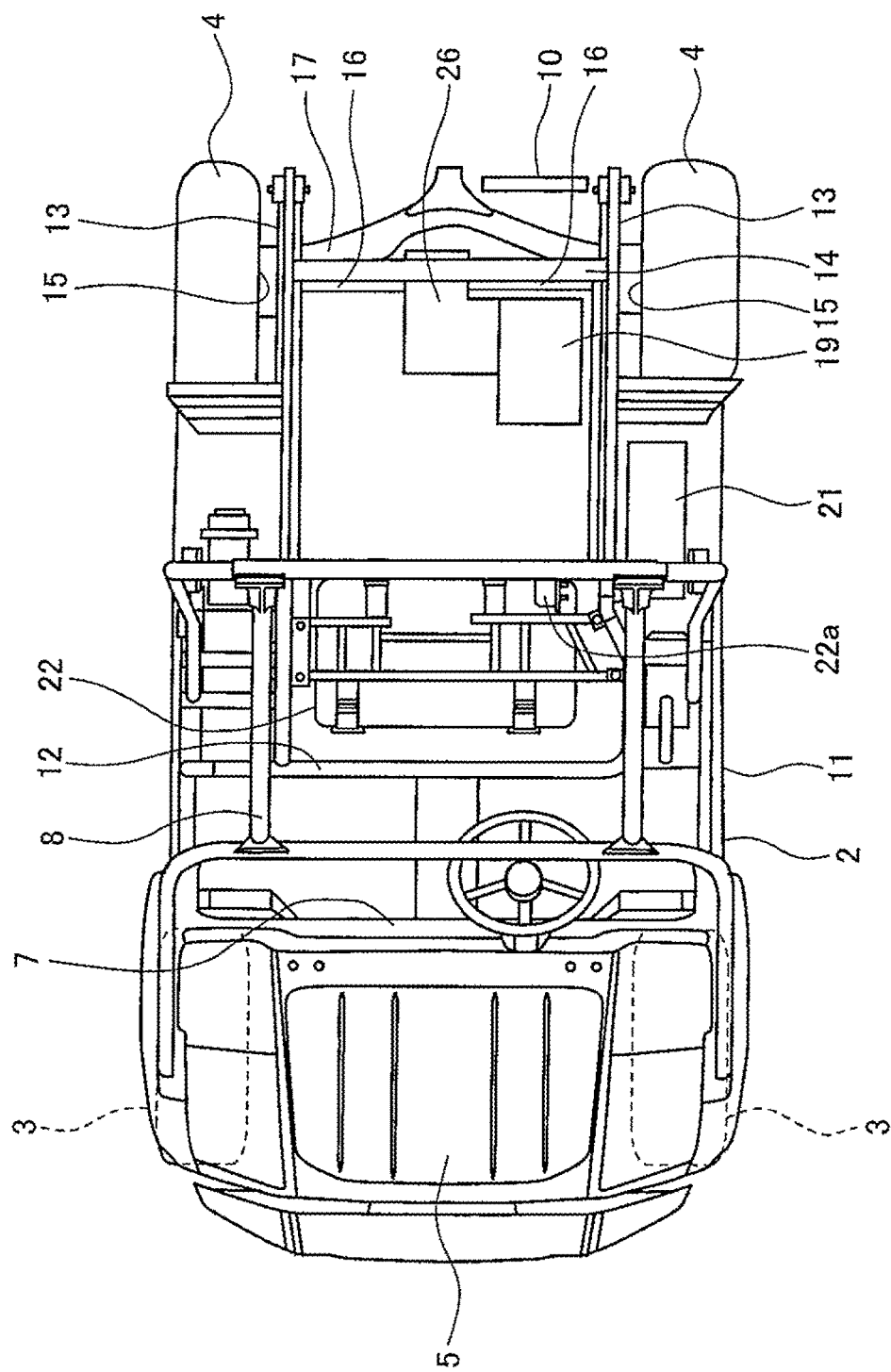
FIG. 2 is a plan view showing the electric utility vehicle of FIG. 1.

FIG. 2 is a plan view showing the electric utility vehicle 1 of FIG. 1. FIG. 2 shows a state where the seat 6 and the cargo bed 9 (see FIG. 1) are detached. As shown in FIG. 2, the vehicle body 2 includes a seat frame 12 which supports the seat 6 (see FIG. 1) from below. Front end portions of a pair of left and right rear frames 13 extending in the forward and rearward direction are connected to the seat frame 12. The rear frames 13 support the cargo bed 9 (see FIG. 1) from below. Rear portions of the left and right rear frames 13 are connected to each other by a cross member 14 extending in a vehicle width direction. Axles 16 extending in the vehicle width direction are respectively connected to the rear wheels 4. A coupling member 17 coupling hubs 15 of the left and right rear wheels 4 in a rightward and leftward direction is located behind the axles 16 and extends in the vehicle width direction.

The vehicle body 2 is provided with: a motor unit 19 (electric component) configured to drive the rear wheels 4 (and the front wheels 3 at the time of four-wheel driving); an inverter 21 (electric component) configured to control the motor unit 19; and a battery unit 22 configured to store the electric power which is to be supplied to the inverter 21. In the motor unit 19, a current is supplied to a coil to generate a magnetic field, and this rotates a rotor. The inverter 21 has a function of converting DC power, supplied from the battery unit 22, into AC power and includes a switching element used to convert the DC power into the AC power. The battery unit 22 is formed in a laterally long shape extending in the vehicle width direction. The inverter 21 is arranged at one vehicle width direction side (left side in the present embodiment). A charging port 22a to which an external charging connector (not shown) is connected is provided at an outer surface (upper surface), located at a vehicle width direction left side, of the battery unit 22.

The motor unit 19, the inverter 21, and the battery unit 22 are provided behind the dashboard 7. The electric components 19 and 21 other than the battery unit 22 are arranged behind the cabin frame 8 and under the cargo bed 9 (see FIG.

1). The battery unit 22 is arranged at a space surrounded by the seat frame 12 located under the seat 6 (see FIG. 1).

The inverter 21 is arranged at a vehicle width direction outer side (left side in the present embodiment) of a front portion of the left rear frame 13. The motor unit 19 is arranged behind the battery unit 22 and in front of the axles 16. The motor unit 19 is arranged at one vehicle width direction side (left side in the present embodiment) portion in a region between the left and right rear frames 13 in plan view. A driving shaft (not shown) of the motor unit 19 projects in the vehicle width direction (rightward direction in the present embodiment). The radiator 10 is arranged behind the axles 16 of the rear wheels 4 and the coupling member 17 and at one vehicle width direction side (left side in the present embodiment).

To be specific, in a case where the inverter 21 and the motor unit 19 are arranged at one vehicle width direction side (left side in the present embodiment) of the center of the vehicle body, the radiator 10 is also arranged in the same side (left side in the present embodiment) of the center of the vehicle body. With this, a cooling medium channel can be made short. A gear box 25 is interposed between the motor unit 19 and each of the axles 16 of the rear wheels 4, and the power output from the motor unit 19 is transmitted through the gear box 25 to the axles 16 of the rear wheels 4.

Figure 3:
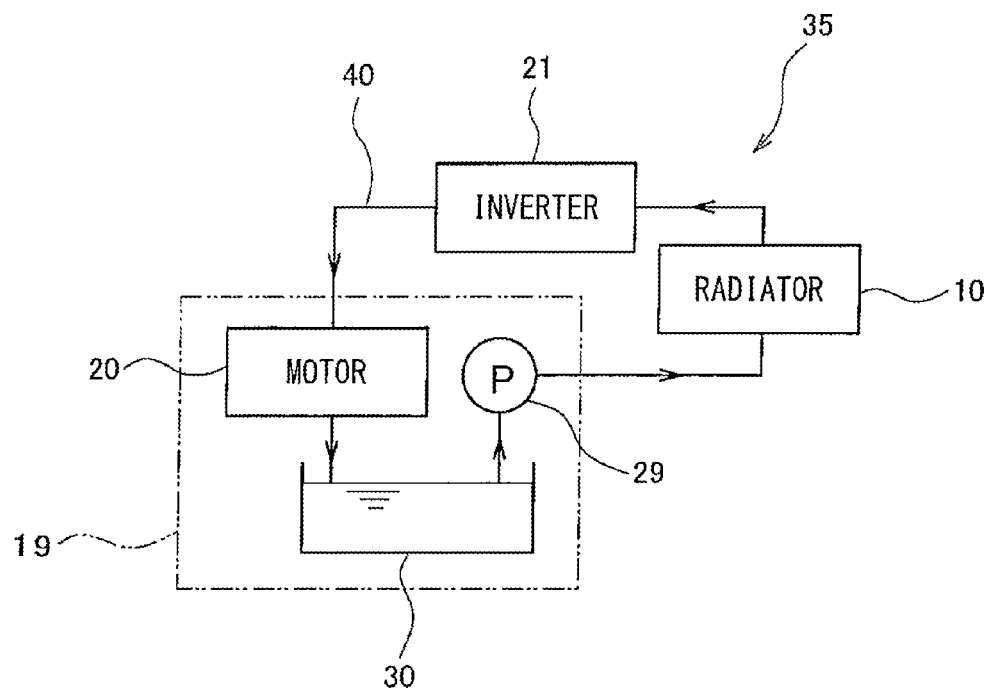
FIG. 3 is a block diagram showing a cooling system of the electric utility vehicle of FIG. 1.

FIG. 3 is a block diagram showing a cooling system 35 of the electric utility vehicle 1 of FIG. 1. As shown in FIG. 3, the cooling system 35 of the present embodiment cools down the inverter 21 and an electric motor 20 which generate heat by the electric energy for generating the rotational power for vehicle traveling. The motor unit 19 integrally includes: the electric motor 20; an oil pan 30 configured to store oil (cooling medium) that has cooled down the electric motor 20; and a pump 29 configured to eject the oil stored in the oil pan 30. The pump 29 is driven by the power from the electric motor 20. With this, the pump 29 can be arranged in the vicinity of the electric motor 20, so that the cooling medium channel between the electric motor 20 and the pump 29 can be shortened.

The oil ejected from the pump 29 is introduced to the radiator 10 to be cooled down, and the oil is then introduced to the inverter 21. The oil introduced to the inverter 21 directly or indirectly takes heat from the switching element which is a heat generating portion of the inverter 21. The oil that has cooled down the inverter 21 is introduced to the electric motor 20. The oil that has cooled down the electric motor 20 is collected in the oil pan 30. To be specific, the cooling system 35 causes the cooling medium to flow through a cooling medium channel 40 to circulate through the inverter 21, the electric motor 20, and the radiator 10. Since a heat generation temperature of each of the electric motor 20 and the inverter 21 is lower than that of the internal combustion engine, a cooling ability of the radiator 10 can be made low. Therefore, even in a case where the radiator 10 is made small and is arranged close to heat generating objects, such as the electric motor 20 and the inverter 21, the radiator 10 can achieve its adequate performance.

The oil introduced to the electric motor 20 is used as both the cooling medium and a lubricating liquid and is used to perform cooling and lubrication of movable portions. To be specific, the oil (cooling medium) directly or indirectly takes heat from the coil that is a heat generating portion of the electric motor 20, and the oil (cooling medium) is supplied to a bearing portion supporting the rotor of the electric motor 20 and/or a bearing portion supporting a rotating body used for power transmission from the motor to an output shaft, to also serve as the lubricating liquid.

Figure 4:
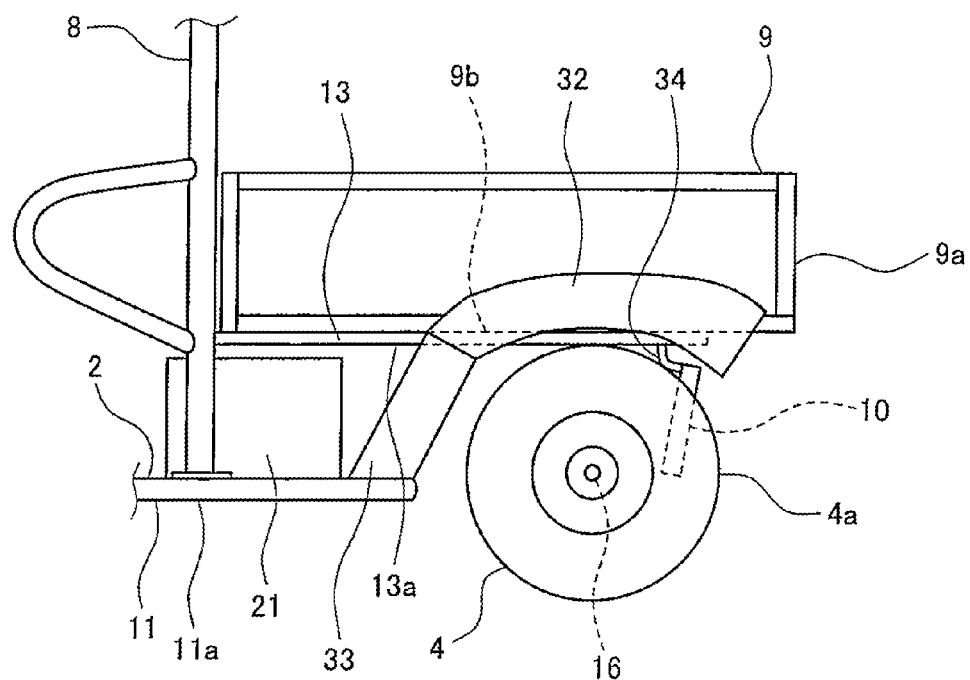
FIG. 4 is a side view showing major portions of the electric utility vehicle of FIG. 1.

FIG. 4 is a side view showing major portions of the electric utility vehicle 1 of FIG. 1. As shown in FIG. 4, the radiator 10 is arranged behind the axles 16 of the rear wheels 4 and under and in front of a rear end of the vehicle body 2. Specifically, the radiator 10 is arranged under the cargo bed 9, in front of a rear end portion 9a of the cargo bed 9, and in front of rear ends 4a of the rear wheels 4. As vehicle body exposed surfaces facing an outer space outside the vehicle, the vehicle body 2 includes a lower surface 9b of the cargo bed 9, a lower surface 11a of the floor frame 11, lower surfaces 13a of the rear frames 13, and the like. The radiator 10 is arranged outside the vehicle body exposed surfaces 9b, 11a, and 13a extending in the forward and rearward direction and extends in a direction intersecting with the vehicle body exposed surfaces 9b, 11a, and 13a. To be specific, the radiator 10 is arranged such that main surfaces thereof intersect with the forward and rearward direction. The radiator 10 is provided at such a position that at least a part thereof is visible when viewed from a vehicle rear side. In the present embodiment, an entire back surface of the radiator 10 is visible when viewed from the vehicle rear side. To be specific, there is no obstacle at a space behind the radiator 10, and the space is open.

The radiator 10 is arranged so as to be spaced apart from the cargo bed 9 in the upper-lower direction such that even when the cargo bed 9 banks, it does not interfere with the radiator 10. The radiator 10 is fixed to an immovable portion of the vehicle body 2 which is different from the cargo bed 9. Specifically, the radiator 10 is fixed to the rear frame 13 of the vehicle body 2 by a bracket 34. A lower end of the radiator 10 is located above a bottom surface of the vehicle body 2 and is especially located above the lower surface 11a of the floor frame 11 located in front of the radiator 10. The radiator 10 is provided in such a rearward inclined posture that an upper end portion thereof is located at a rear side of a lower end portion thereof. The radiator 10 is provided with a cooling medium replenishing port (not shown) through which the cooling medium is replenished. The cooling medium replenishing port is sealed by a cap or the like.

According to the above-explained configuration, in a case where the inverter 21 and electric motor 20 of the utility vehicle 1 constituted by an electric vehicle are arranged behind the dashboard 7, the radiator 10 through which the cooling medium for cooling the inverter 21 and the electric motor 20 flows is also arranged behind the dashboard 7. Therefore, the channel 40 through which the cooling medium circulating through the inverter 21, the electric motor 20, and the radiator 10 flows can be made short. To be specific, since the amount of heat generated by the electric component of the electric vehicle is smaller than the amount of heat generated by the internal combustion engine, the radiator 10 can be arranged close to the inverter 21 and the electric motor 20 without being arranged in the front space S1 located under the hood 5. With this, the liquid leakage countermeasure of the cooling medium channel 40 can be facilitated, and the need of increasing the performance of the pump for circulating the cooling medium can be eliminated. Especially, since the inverter 21, the electric motor 20, and the radiator 10 are arranged in a space located under the cargo bed 9, the cooling liquid channel can be arranged in the same space. Thus, the layout of the cooling system for the electric components can be simplified and made compact.

Even in a case where a driving speed of the electric utility vehicle 1 is low, the ram air flowing rearward through the vehicle body 2 along virtual lines extending along the vehicle body exposed surfaces 9b, 13a, and 11a suitably takes heat from the radiator 10. Therefore, even in a case where the radiator 10 is arranged at a vehicle body rear portion, an adequate cooling performance for cooling down heat generating parts can be obtained. Further, at least a part of the radiator 10 is visible when viewed from the vehicle rear side. Therefore, outside air more easily contacts and flows through the radiator 10 than a case where the rear side of the radiator 10 is covered with the other part, so that ventilation resistance becomes low. On this account, even in a case where the radiator 10 is not provided in front of the dashboard 7, the heat exchange between the outside air and the cooling medium can be performed smoothly.

Since the radiator 10 is arranged behind the axles 16 of the rear wheels 4, the number of other parts arranged behind the radiator 10 is little. Thus, the ventilation resistance when the outside air contacts and flows through the radiator 10 can be made adequately low. In addition, the radiator 10 is arranged in front of the rear end portion 9a of the cargo bed 9, especially in front of the rear ends 4a of the rear wheels 4. Therefore, even in a case where an obstacle or the like gets close to the vehicle from behind, it contacts the cargo bed 9 or the rear wheels 4 before contacting the radiator 10. On this account, the radiator 10 can be easily protected.

Even in a case where the radiator is arranged behind a driving power source, influences of waste heat of the electric motor 20 as the driving power source on the radiator 10 at the time of traveling are smaller than influences of waste heat of the internal combustion engine as the driving power source on the radiator 10 at the time of traveling. Thus, the adequate cooling performance can be secured. Further, since the radiator 10 is arranged in the vehicle body rear portion where the number of onboard parts arranged is small, the interference of the radiator 10 with the other onboard parts can be reduced, and the degree of freedom of the design can be increased.

Further, the radiator 10 is located above the lower surface 11a of the floor frame 11 located in front of the radiator 10. Therefore, obstacles, such as rocks, which have passed through a vehicle body bottom surface, can be prevented from contacting the radiator 10. In addition, since the radiator 10 is provided in the rearward inclined posture, the radiator 10 easily catches the ram air flowing along the lower surface 9b of the cargo bed 9 and the lower surface 13a of the rear frame 13. Further, since a heat exchange surface of the radiator 10 is arranged so as to intersect with a vertical direction, the outside air having taken heat from a lower portion of the radiator can be prevented from flowing through an upper portion of the radiator as much as possible. Thus, the cooling ability during stopping and low-speed traveling can be improved. Since the radiator 10 is arranged at the vehicle body rear portion, maintenance of replenishing the cooling medium through the cooling medium replenishing port of the radiator 10 becomes easy.

Embodiment 2

Figure 5:
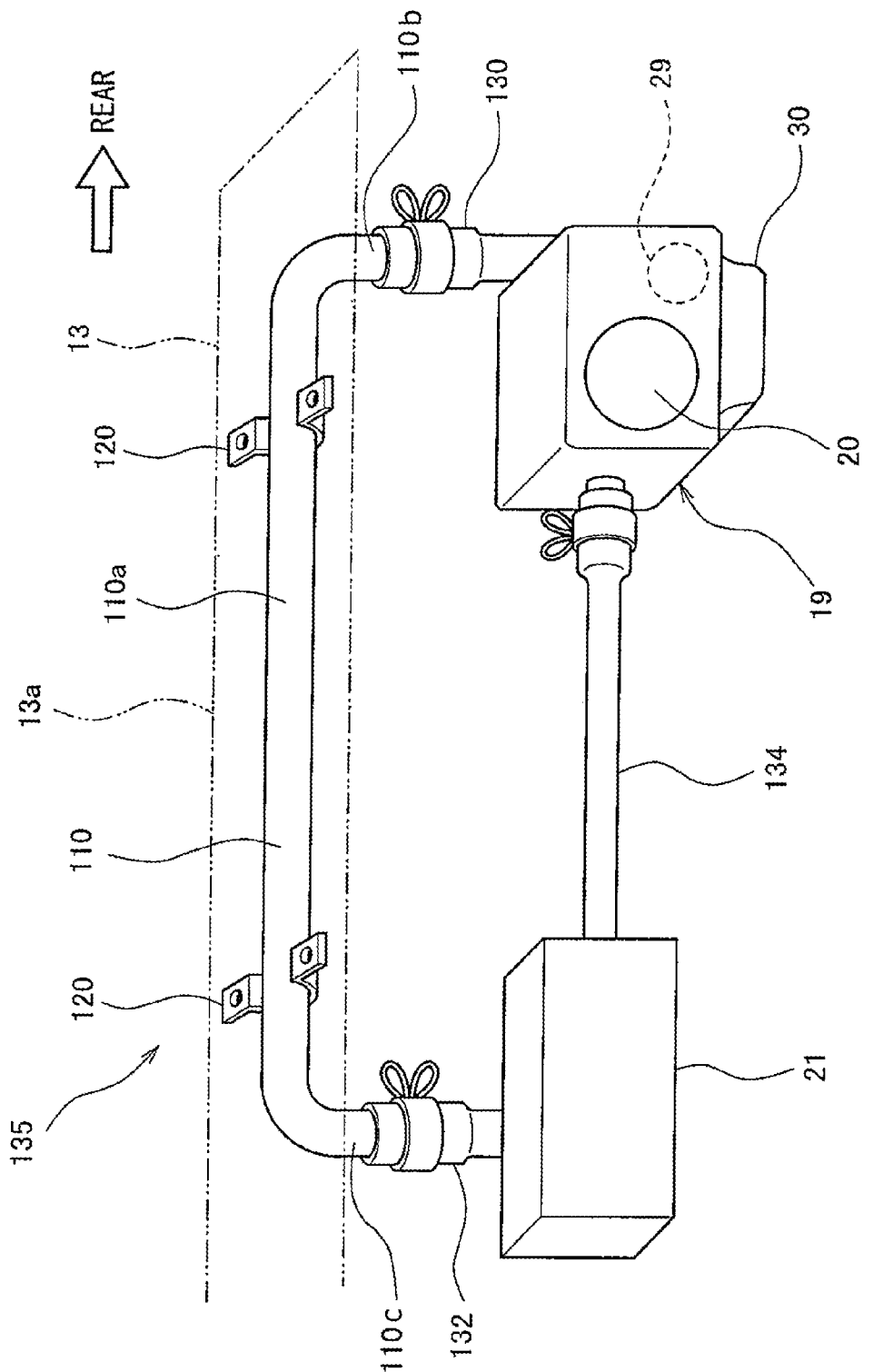
FIG. 5 is a perspective view showing the cooling system of the electric utility vehicle according to Embodiment 2 of the present invention.

FIG. 5 is a perspective view showing a cooling system 135 of the electric utility vehicle according to Embodiment 2 of the present invention. As shown in FIG. 5, in the cooling system 135 of Embodiment 2, instead of the radiator, a tubular member 110 made of metal (such as aluminum) is used as a heat exchanger. The tubular member 110 is provided so as to contact the frame, made of metal (such as aluminum), of the vehicle body and transmits the heat of the cooling medium, flowing through the tubular member 110, to the frame to radiate the heat. Specifically, the tubular member 110 is arranged so as to contact the lower surface 13a of the rear frame 13, and support tools 120 supporting the tubular member 110 are fixed to the rear frame 13 by fixtures (not shown), such as screws or bolts. The tubular member 110 is provided at such a position that at least a part thereof is visible when viewed from the vehicle rear side.

The lower surface 13a of the rear frame 13 is the vehicle body exposed surface facing the outer space. The tubular member 110 is arranged outside the lower surface 13a of the rear frame 13 to extend in a direction along the lower surface 13a. The tubular member 110 includes: a main body portion 110a extending along the frame 13; and end portions 110b and 110c respectively projecting from both ends of the main body portion 110a so as to be away from the frame 13. The end portion 110b of the tubular member 110 is connected to the motor unit 19 via a hose 130. The end portion 110c of the tubular member 110 is connected to the inverter 21 via a hose 132. The inverter 21 is connected to the motor unit 19 via a hose 134.

The oil ejected from the pump 29 of the motor unit 19 is introduced to the tubular member 110 and exchanges heat with the outside air via the tubular member 110 and the rear frame 13, contacting the tubular member 110, to be cooled down. To be specific, the ram air flowing along the lower surface 13a that is the vehicle body exposed surface contacts the tubular member 110 and the rear frame 13. Thus, the heat of the oil flowing through the tubular member 110 is radiated to the outside. The cooled oil is introduced to the inverter 21, and the oil that has cooled down the inverter 21 is introduced to the electric motor 20. The oil that has cooled down the electric motor 20 is collected in the oil pan 30.

According to the above-explained configuration, the heat exchanger can be realized by a simple configuration without using the so-called radiator. In addition, since the tubular member 110 is provided along the frame 13 so as to contact the frame 13, the frame 13 having a surface area which is large to some extent can be utilized as a heat radiating member. Therefore, the heat exchange can be effectively performed while efficiently utilizing the space. The tubular member 110 is provided along the vehicle body exposed surface through which the ram air flows. Therefore, even in a case where the tubular member 110 is arranged in the vehicle body rear portion, a satisfactory heat radiation performance can be achieved. The other components are the same as those of Embodiment 1, so that explanations thereof are omitted. In the present embodiment, the cooling medium flows through the tubular member 110 attached to the frame 13. However, the cooling medium may flow through a tubular frame, the tubular member may contact a part of the cargo bed made of metal, or the cooling medium may flow through the inside of the cargo bed.

Embodiment 3

Figure 6:
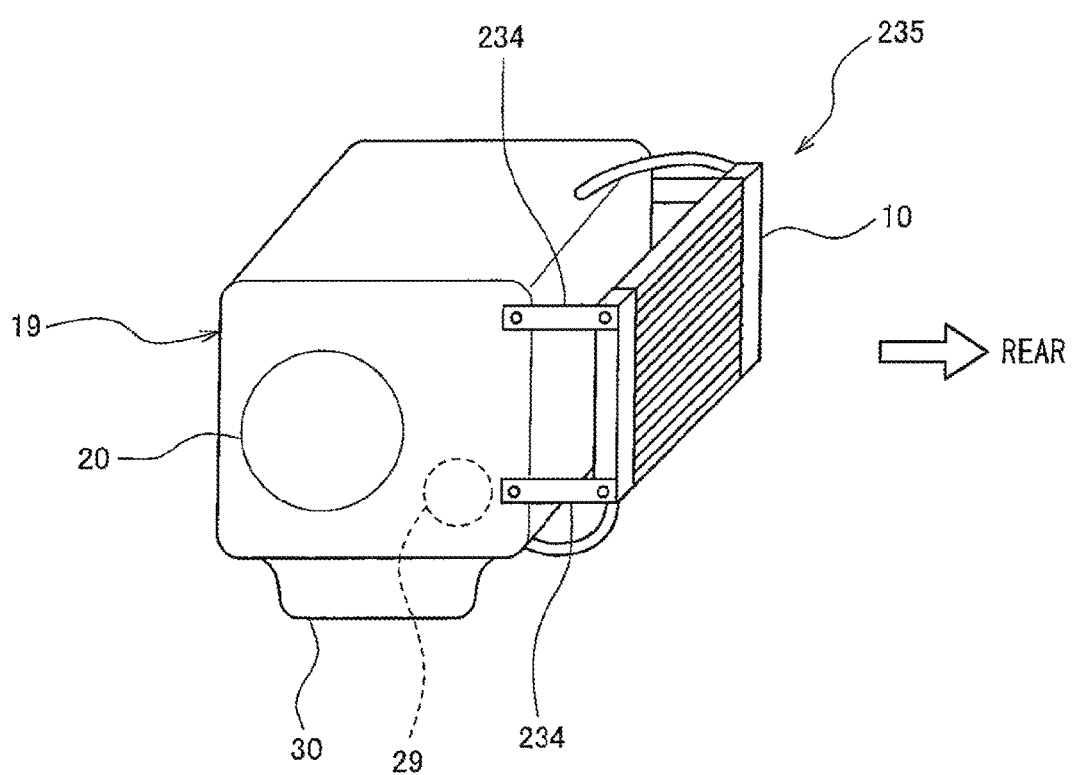
FIG. 6 is a perspective view showing the cooling system of the electric utility vehicle according to Embodiment 3 of the present invention.

FIG. 6 is a perspective view showing a cooling system 235 of the electric utility vehicle according to Embodiment 3 of the present invention. As shown in FIG. 6, in the cooling system 235 of the present embodiment, the radiator 10 is fixed to the motor unit 19 but not to the frame. Specifically, the radiator 10 is arranged behind the motor unit 19 so as to be spaced apart from the back surface of the motor unit 19 and is fixed to the motor unit 19 via brackets 234. The radiator 10 is arranged so as to intersect with the forward and rearward direction and is provided at such a position that at least a part thereof is visible when viewed from the vehicle rear side. As described above, the motor unit 19 is integrally provided with the pump 29. Although not shown, the inverter 21 may include the same cooling system as above.

According to the above-explained configuration, while using the configuration of circulating the cooling medium through the radiator 10 and the electric components (such as the motor unit 19 and the inverter 21), the radiator 10, the electric components, and the pump are unitized. Therefore, the cooling medium channel can be made short, and in addition, the handleability at the time of the assembly of the vehicle can be improved. The other components are the same as those of Embodiment 1, so that explanations thereof are omitted.

The present invention is not limited to the above embodiments, and modifications, additions, and eliminations may be made within the scope of the present invention. The above embodiments may be combined arbitrarily. A part of the components or method of one embodiment may be applied to another embodiment. For example, in Embodiments 1 and 2, the motor 20 and the inverter 21 are serially cooled down by using the radiator 10 but may be respectively cooled down by separate systems. The motor 20 and the inverter 21 may be respectively cooled down by separate cooling mediums. For example, the motor 20 and the inverter 21 may be configured such that one of them is cooled by water (medium for cooling), and the other is cooled by oil (medium for cooling and lubrication). Only one of the electric motor 20 and the inverter 21 may be cooled down by the radiator 10. In this case, a heat generating body to be cooled down by the radiator 10 is only required to be arranged behind the dashboard 7. The oil pan for lubrication may be reduced in size and weight by separately using a cooling liquid and a lubricating liquid. A part of the back surface of the radiator 10 may be hidden by a number plate or the like when viewed from behind. The radiator 10 may have such an inclined shape that a rightward and leftward direction middle portion is located behind both rightward and leftward direction end portions.

The radiator 10 is only required to be arranged in the vicinity of the heat generating body. The radiator 10 may be arranged such that: a heat radiating surface thereof extends in the forward and rearward direction along a vehicle body side surface or the vehicle body bottom surface; or the heat radiating surface thereof extends in the vehicle width direction along a vehicle body back surface. The cooling medium may be the cooling liquid. However, the cooling medium does not have to be a liquid and may be a gas. The electric component as a cooling target may be the electric component which generates heat by the electric energy for generating the rotational power for vehicle traveling. The battery unit, a DCDC converter, and the like may be the cooling targets. The battery unit 22 supplies the electric power by using a chemical reaction. However, like a capacitor, the battery unit 22 may supply the electric power by using an electric reaction. The above-described features may be applied to an electric vehicle other than the utility vehicle as long as the electric vehicle includes a heat exchanger for cooling down an electric part which generates heat. The above-described features may be applied to vehicles not including the cargo beds, for example, to four-wheeled vehicles, such as saddled four-wheel all terrain vehicles and golf carts.

INDUSTRIAL APPLICABILITY

As above, the electric vehicle according to the present invention has an excellent effect of facilitating the liquid leakage countermeasure of the cooling medium channel and eliminating the need of increasing the performance of the pump for circulating the cooling medium. Therefore, it is useful to widely apply the present invention to utility vehicles and the like which can utilize the significance of the above effects.

REFERENCE CHARACTER LIST 1 electric utility vehicle (electric vehicle)
2 vehicle body
5 hood
6 seat
7 dashboard
9 cargo bed
9b lower surface (vehicle body exposed surface)
10 radiator (heat exchanger)
11 floor frame
11a lower surface (vehicle body exposed surface)
13 rear frame
13a lower surface (vehicle body exposed surface)
20 electric motor (electric component)
21 inverter (electric component)
110 tubular member (heat exchanger)
S1 front space
S2 boarding space

The invention claimed is:

1. An electric vehicle comprising:
a vehicle body including a dashboard which separates a front space covered with a hood and a boarding space provided with a seat on which a driver is seated;
an electric component which is provided behind the dashboard and generates heat by electric energy for generating rotational power for vehicle traveling, the electric component including a motor unit; and
a radiator provided behind the dashboard and configured to cool down a cooling medium circulating between the radiator and the electric component, wherein:
the vehicle body includes a vehicle body exposed surface facing an outer space;
the radiator is arranged outside the vehicle body exposed surface; and
the radiator is fixed to not the vehicle body but the motor unit.

2. The electric vehicle according to claim 1, wherein:
the radiator radiates the heat of the cooling medium to outside air which contacts and flows through the radiator; and
the radiator is arranged outside the vehicle body exposed surface so as to extend in a direction along the vehicle body exposed surface or a direction intersecting with the vehicle body exposed surface.

3. The electric vehicle according to claim 1, wherein:
the radiator radiates the heat of the cooling medium to outside air which contacts and flows through the radiator;
the radiator is arranged so as to intersect with a forward and rearward direction of the electric vehicle; and
the radiator is provided at such a position that at least a part thereof is visible when viewed from a vehicle rear side.

4. The electric vehicle according to claim 1, wherein the radiator is arranged behind axles of rear wheels and under and in front of a rear end of the vehicle body.

5. The electric vehicle according to claim 1, further comprising a cargo bed provided at the vehicle body so as to be arranged behind the boarding space, wherein:
the radiator and the electric component are arranged under the cargo bed.

6. The electric vehicle according to claim 1, wherein the electric component includes at least an inverter.

7. The electric vehicle according to claim 1, further comprising a cargo bed provided in the vehicle body so as to be arranged behind the boarding space, wherein:

the radiator is arranged under the cargo bed;
the radiator radiates the heat of the cooling medium to outside air which contacts and flows through the radiator; and
a heat exchange surface of the radiator is arranged so as to intersect with a forward and rearward direction of the electric vehicle.

8. The electric vehicle according to claim 1, wherein:
the vehicle body includes a metal frame having the vehicle body exposed surface; and
the radiator is a metal tubular member contacting the vehicle body exposed surface of the frame.

9. The electric vehicle according to claim 8, wherein:
the electric component includes an inverter; and
the tubular member connects the motor unit to the inverter.

10. An electric vehicle, comprising:
a vehicle body including a dashboard which separates a front space covered with a hood and a boarding space provided with a seat on which a driver is seated;
an electric component which is provided behind the dashboard and generates heat by electric energy for generating rotation power for vehicle traveling;
a radiator provided behind the dashboard and configured to cool down a cooling medium circulating between the radiator and the electric component; and
a cargo bed provided at the vehicle body so as to be arranged behind the boarding space; wherein:
the vehicle body includes a vehicle body exposed surface facing an outer space;
the radiator is arranged outside the vehicle body exposed surface, behind the boarding space and under the cargo bed;
a lower end of the radiator is located above a bottom surface of the vehicle body; and
an entire back surface of the radiator is visible when viewed from a vehicle rear side.

11. The electric vehicle according to claim 10, wherein:
the radiator is arranged under the cargo bed.

12. The electric vehicle according to claim 11, wherein:
the radiator is arranged behind axles of rear wheels and under and in front of a rear end of the vehicle body.

13. The electric vehicle according to claim 10, wherein:
a heat exchange surface of the radiator is arranged so as to extend in a direction intersecting with a vertical direction.

14. The electric vehicle according to claim 10, wherein:
the electric component includes an inverter;
the inverter is arranged at one side of a center of the vehicle body in a vehicle width direction; and
the radiator is also arranged at the one side of the center of the vehicle body in the vehicle width direction.

15. The electric vehicle according to claim 10, wherein:
the radiator is arranged behind axles of rear wheels; and
the radiator is provided in such a rearward inclined posture that an upper end portion of the radiator is located at a rear side of a lower end portion of the radiator.

16. The electric vehicle according to claim 10, wherein the cargo bed is capable of banking so as to incline rearward.

* * * * *